United States Patent
Ranalli et al.

(10) Patent No.: US 7,581,386 B2
(45) Date of Patent: Sep. 1, 2009

(54) MOTOR VEHICLE PROVIDED WITH A DIESEL PROPULSION ENGINE

(75) Inventors: Marco Ranalli, Augsburg (DE); Stefan Schmidt, Langweid (DE); Andreas Mayr, Waltershofen (DE); Jurgen Klement, Asbach-Baumenhain (DE)

(73) Assignee: Zeuna-Starker GmbH & Co. KG, Augsburg (DE)

( * ) Notice: Subject to any disclaimer, the term of this patent is extended or adjusted under 35 U.S.C. 154(b) by 771 days.

(21) Appl. No.: 10/499,897

(22) PCT Filed: Nov. 12, 2003

(86) PCT No.: PCT/EP03/12614

§ 371 (c)(1),
(2), (4) Date: Jun. 6, 2005

(87) PCT Pub. No.: WO2004/051059

PCT Pub. Date: Jun. 17, 2004

(65) Prior Publication Data

US 2006/0144632 A1 Jul. 6, 2006

(30) Foreign Application Priority Data

Dec. 5, 2002 (DE) ................................ 102 56 769

(51) Int. Cl.
*F01N 3/00* (2006.01)
(52) U.S. Cl. .............................. 60/286; 60/295; 60/297; 60/301; 60/303; 60/311; 60/320
(58) Field of Classification Search .................. 60/286, 60/295, 301, 303, 297, 311, 320
See application file for complete search history.

(56) References Cited

U.S. PATENT DOCUMENTS

| 3,498,279 | A | * | 3/1970 | Seeley, Jr. .................... 123/549 |
| 3,902,371 | A |   | 9/1975 | Nagai et al. |
| 3,908,371 | A | * | 9/1975 | Nagai et al. .................... 60/301 |

(Continued)

FOREIGN PATENT DOCUMENTS

DE    31 39 565    8/1982

(Continued)

OTHER PUBLICATIONS

International Search Report dated Mar. 4, 2004.

*Primary Examiner*—Thomas E Denion
*Assistant Examiner*—Diem Tran
(74) *Attorney, Agent, or Firm*—Carlson, Gaskey & Olds, PC (57) ABSTRACT

A motor vehicle includes a diesel propulsion engine and an exhaust system that comprises a discontinuously regenerating exhaust gas purification system. A fuel evaporator unit serves to enrich engine exhaust gases with fuel vapors. The fuel evaporator unit is connected to a vehicle fuel tank, and is provided upstream of the exhaust gas purification system. The fuel evaporator unit includes a fuel evaporator in the form of a heat exchanger that is exposed to the exhaust gas stream. The heat exchanger has a fuel feed line and a fuel vapor discharge. The fuel evaporator unit also includes an auxiliary oxidizing converter connected upstream of the heat exchanger. A percentage of nonburned diesel fuel in the exhaust gases fed into the auxiliary oxidizing converter is adjustable using an enrichment device.

21 Claims, 4 Drawing Sheets

U.S. PATENT DOCUMENTS

| | | | |
|---|---|---|---|
| 5,412,946 A * | 5/1995 | Oshima et al. | 60/286 |
| 5,711,149 A * | 1/1998 | Araki | 60/286 |
| 6,170,259 B1 | 1/2001 | Boegner et al. | |
| 6,928,806 B2 * | 8/2005 | Tennison et al. | 60/286 |
| 2002/0038542 A1 | 4/2002 | Akama et al. | |

FOREIGN PATENT DOCUMENTS

| | | |
|---|---|---|
| DE | 195 04 183 | 8/1996 |
| DE | 195 33 355 | 3/1997 |
| DE | 197 17 544 | 10/1998 |
| EP | 0 132 166 | 1/1985 |
| EP | 0 743 429 | 11/1996 |
| FR | 2 731 746 | 9/1996 |
| GB | 2 084 898 | 4/1982 |
| JP | 63068714 | 3/1988 |

* cited by examiner

MOTOR VEHICLE PROVIDED WITH A DIESEL PROPULSION ENGINE

BACKGROUND OF THE INVENTION

This invention concerns an exhaust system for a motor vehicle equipped with a diesel propulsion engine, the exhaust system of which comprises a discontinuously regenerating exhaust gas purification system. Discontinuously regenerating exhaust gas purification systems include components such as diesel particulate filters and NOx-accumulating catalytic converters.

To comply with environmental specifications, exhaust gases of motor vehicles propelled by combustion engines are subjected to a purification process. Specifically, appropriate particulate filters are utilized to reduce particulate emissions of exhaust gases of motor vehicles propelled by diesel engines. Such particulate filters must be periodically regenerated by burning off particles accumulated on a filter surface. Due to the relatively low exhaust gas temperatures of modern diesel engines, to initiate regeneration, the exhaust gas temperature must be raised by approximately 100° C., using appropriate procedures or devices. The exhaust gas temperature must be raised if filter regeneration is to be feasible in conditions other than full load operation, even if fuel additives are used that are capable of lowering particulate ignition temperature. Without such additives, depending on the soot composition, the particulate ignition temperature ranges between 470° C. and 600° C. However, the use of such additives, in the long run, can cause the particulate filter to clog, necessitating its cleaning.

For this purpose various burners (refer, e.g., to DE 19504183 A1 and DE 19717544 A1) have been proposed for installation upstream of the particulate filter. Some disadvantages with such burners are the considerable structural and financial efforts associated with such burners, the considerable increase in space required due to the integration of a relatively large burner into the exhaust system, and the detrimental effect on the flow conditions within the exhaust pipe.

One solution, which relative to some of the above mentioned aspects, is more favorable, has been proposed in EP 132166 A1. In EP 132166, a low-boiling, organic fluid evaporates at a glow plug that extends into an exhaust gas carrying component located upstream of the particulate filter. Vapors either ignite at the tip of the glow plug after their thorough mixing with the oxygenous exhaust gas or, without any ignition, are mixed into the stream of exhaust gases. In the latter case a temperature increase of the exhaust gases ducted to the particulate filter, is obtained by catalytic oxidation of the vapors of the organic fluid in a catalytically coated area of the particulate filter. A particular disadvantage of this is the engineering and logistic effort associated with the storage of the low boiling organic fluid. Furthermore, the regeneration of the diesel particulate filter utilizing this heating device calls for exhaust gas temperatures of above 450° C., which in modern diesel engines can only be attained under full load.

A comparable approach is pursued by DE 19533355 A1 in which the temperature of the exhaust gases is raised for the purpose of regenerating a particulate filter by catalytically burning an auxiliary fuel, particularly a fuel gas, in an oxidizing converter connected upstream of the filter, utilizing the remaining oxygen in the exhaust gas stream and essentially without any additional combustion air. The disadvantages arising from it are the same as described before in conjunction with EP 132166 A1.

DE 3139565 A1, from which a motor vehicle of a generic kind may be derived, describes using atomizer nozzles to inject diesel fuel into, or immediately upstream of, a catalytically coated area of a particulate filter to increase the exhaust gas temperature in this manner by means of catalytic oxidation of the fuel. An electrical heating element is embedded in the catalytically coated area of the particulate filter to initiate catalytic oxidation. Specific disadvantages of the DE 3139565 A1 system are, aside from a considerable non-homogeneity of the temperature distribution, the fact that due to the partial evaporation the atomized fuel draws heat from the exhaust gas stream, and that the atomizer nozzles—given the conditions prevailing in non-purified exhaust gases of a diesel engine—tend to clog, thereby rendering the respective heating device non-functional within a short period of time. Thus, systems based on DE 3139565 A1 were never really utilized.

Finally, attempts have been made to increase the exhaust gas temperature up to the ignition temperature of the soot collecting on the particulate filter, using electrical heating elements. These attempts were quickly aborted as the required electrical power was not available in conventional motor vehicles.

NOx-accumulating catalytic converters are increasingly used to reduce the emission of nitrogen oxides. The regeneration of these converters requires an enrichment of the exhaust gases. While this is not a problem with gasoline engines, diesel engines that operate with excess air and whose exhaust gases therefore, as a rule, also contain excess air, require special procedures.

SUMMARY OF THE INVENTION

In the light of the state of the art explained above, the object of this invention is to create a motor vehicle of the kind specified at the beginning, whose exhaust gas purification system offers a reliable regeneration while featuring a technically rather simple and low-cost structure of the exhaust system and requiring a minimum of effort.

This objective has been met by this invention and offers the following design features:
- a fuel evaporator unit connected to the fuel tank of the vehicle, is provided upstream of the exhaust gas purification device and serves to enrich the engine exhaust gases with fuel vapors;
- the fuel evaporator unit comprises a fuel evaporator in the form of a heat exchanger exposed to the exhaust gas stream, having a fuel feed line and a fuel vapor discharge opening, as well as an auxiliary oxidizing converter located upstream of the heat exchanger; and
- a percentage of nonburned diesel fuel in the exhaust gas fed to the auxiliary oxidizing converter is adjustable by using an enrichment device.

The inventive system serves to regenerate a downstream exhaust gas purification device, and comprises multiple components that interact based on a specific way of tuning. One of these components is a fuel evaporator configured as a heat exchanger, and which is exposed to the exhaust gas stream. Diesel fuel supplied through a fuel feed line is vaporized based on heat drawn from the exhaust gases. Fuel vapors exit the fuel evaporator through a fuel vapor discharge opening. In the auxiliary oxidizing converter that is upstream of the fuel evaporator, the exhaust gases are heated to the temperature required for efficient operation of the heat exchanger, such as by catalytic combustion of a percentage of nonburned fuel contained in the exhaust gases. This percentage of nonburned fuel in the exhaust gases fed to the auxiliary oxidizing converter is adjustable using an enrichment device. Regarding enrichment devices, a specific engine controller is a special consideration, which during regeneration of the exhaust gas purification device, controls the percentage of nonburned fuel in the exhaust gases that is required for the heating of exhaust gases in the auxiliary oxidizing converter, using engine-related procedures. Nevertheless, the enrichment device may also comprise an auxiliary evaporator that includes an electrical heating device, where the former feeds fuel vapors into the exhaust gases upstream of the auxiliary oxidizing converter. Likewise, at least a portion of the fuel vapors generated in the heat exchanger may be added to the exhaust gases in the enrichment device.

The system explained above, which is realized in motor vehicles based on this invention, may be utilized especially for the regeneration of a particulate filter as well as for the regeneration of a NOx-accumulating catalytic converter, or for the regeneration of a combined exhaust gas purification device. In the first case the entire amount of fuel vapors generated in the heat exchanger is fed into the exhaust gas stream, upstream of the auxiliary oxidizing catalytic converter. After the regeneration phase has been initiated by an external enrichment device (e.g., engine controller or auxiliary evaporator—see above), enrichment of the exhaust gases fed to the auxiliary oxidizing converter therefore occurs exclusively through the fuel vapors discharged from the heat exchanger. Depending on the respective operating point of the engine, an appropriate amount of fuel is vaporized and subsequently, catalytically burned in the auxiliary oxidizing catalytic converter to ensure that the temperature of the exhaust gases downstream of the heat exchanger is sufficient for the regeneration of the downstream particulate filter. If however, the system based on this invention is utilized for the regeneration of a NOx-accumulating catalytic converter, then it serves to enrich the exhaust gases fed to the NOx-accumulating catalytic converter. For this purpose specifically, at least one portion of the fuel vapors generated in the heat exchanger may be fed into the exhaust gases downstream of the auxiliary oxidizing converter, especially, directly at the heat exchanger itself. Also, all of the fuel vapors generated in the heat exchanger are fed into the exhaust gas stream, upstream of the auxiliary oxidizing converter, whereas the extent of the transformation of those fuel vapors by catalytic combustion in the auxiliary oxidizing converter is limited by the excess air in the exhaust gases, so that an enrichment of the exhaust gases required for the regeneration of the NOx-accumulating catalytic converter occurs in the fuel evaporator unit.

One preferred embodiment of the invention includes the feature that the exhaust gas purification device comprises a discontinuously regenerating particulate filter. In the regeneration mode the auxiliary oxidizing converter heats up the exhaust gases streaming toward the particulate filter, using catalytic combustion of the fuel vapors generated in the heat exchanger and fed into the exhaust gas stream upstream of the auxiliary oxidizing converter.

According to another preferred further development of this invention, the exhaust gas purification device includes a discontinuously regenerating NOx-accumulating catalytic converter where in the regeneration mode at least one portion of the fuel vapors generated in the heat exchanger are added to the exhaust gas stream, downstream of the auxiliary oxidizing converter.

For both alternatives the enrichment device may comprise a specific engine controller or an auxiliary evaporator including an electrical heating device, where in the latter case the auxiliary evaporator feeds fuel vapors into the exhaust gases upstream of the auxiliary oxidizing converter.

If an auxiliary evaporator as defined above is utilized, it is preferred that the auxiliary evaporator be installed with spatial separation from any exhaust gas carrying components.

Between the auxiliary evaporator and one exhaust gas carrying component, a fuel vapor feed line extends that discharges into an exhaust gas carrying component upstream of the auxiliary oxidizing converter. Specifically, in this further development, the auxiliary evaporator does not extend into any of the exhaust gas carrying components connected upstream of the auxiliary oxidizing converter. The spatial separation of the auxiliary evaporator from any exhaust gas carrying components, and the feeding of the fuel vapors supplied by the auxiliary evaporator into the exhaust pipe upstream of the auxiliary oxidizing converter using a fuel vapor feed line, prevents the auxiliary evaporator from being exposed to substantially fluctuating exhaust gas temperatures during vehicle operation. In this manner the environmental conditions in which the auxiliary evaporator is expected to provide fuel vapors, are easier to monitor and to level. This again permits the auxiliary evaporator, which includes an electrical heating element, to be functionally optimized, making it suitable for the vaporization of diesel fuel with consistently good results. Furthermore, the feeding of fuel vapors provided by the auxiliary evaporator into the exhaust pipe using a fuel vapor feed line, provides improved flow conditions within the exhaust pipe than would occur during the use of conventional burners. Further, there is a clear increase in flexibility regarding the spatial arrangement and/or the placing of the auxiliary evaporator; the latter has particular advantages for modern vehicles where occasionally the installation conditions for the exhaust system are quite restricted.

The fuel vapor feed line may especially discharge into a cross-sectional restriction of the specific exhaust gas carrying component configured as a venturi nozzle. The resulting pressure drop in the fuel vapor feed line and the auxiliary evaporator unit favors the evaporation of diesel fuel and, by appropriately lowering the boiling range, helps reduce the electrical energy consumed for evaporation.

Another preferred further development provides that the auxiliary evaporator unit comprises an upright glow plug which, while maintaining an annular gap, is surrounded by a jacket tube into which both the fuel line and the fuel vapor feed line discharge. The upright arrangement of the glow plug favors a particularly homogenous vaporization of the diesel fuel fed into the annular gap defined between the glow plug and the jacket tube. A particularly favorable evaporation characteristic is obtained when an internal width of the referenced annular gap is between 0.6 mm and 2 mm. With such a configuration and with respect to evaporation results, optimum conditions are obtained for individual, actuating variables such as heat transfer, dripping due to boiling, capillary effects, etc.

It was found to be particularly advantageous to have a spiral lead element installed in the annular gap located between the glow plug and the jacket tube. This serves to lead the heated and boiling fuel and, subsequently, the fuel vapors in a spiral path around the glow plug so that any local temperature differences on the surface of the glow plug can be evened out, and that due to the extended flow path, an homogenizing effect is obtained for the prepared fuel vapors. Furthermore, due to the spin flow, any emerging fuel drippings are exposed to centrifugal forces, which favor condensation of the drippings on the jacket tube so that, even in particularly compact auxiliary evaporator units, the risk of any fuel drippings getting into the exhaust gas stream is very low. This risk can be further reduced by having an end of the fuel vapor feed line that faces the auxiliary fuel evaporator, extend into the jacket tube above the glow plug. The issue in this situation is a cyclonic function of the unit consisting of the auxiliary evaporator and the fuel vapor feed line, such that the fuel vapors drawn from the auxiliary evaporator are free of any fuel drippings, which due to centrifugal forces, would drift radially outward in the direction of the jacket tube.

The jacket tube may be encompassed by an insulator. To provide additional optimization of the evaporation process, the use of an insulator allows the environment in which the auxiliary evaporator unit operates, to be evened out further.

Regarding the dimensions of the fuel vapor feed line, the ratio of the fuel vapor feed line cross-section to the cross-section of the exhaust gas carrying component, particularly in the area of the fuel vapor feed line discharge, is preferably between 0.006 and 0.015. This ratio proves to be particularly favorable with regard to a proper mixture of fuel vapors fed into the exhaust gas stream without interfering with the flow conditions in the exhaust pipe when not in the regenerating mode.

In the event that the system based on this invention is put into operation for regeneration of a particulate filter, another preferred further development of this invention utilizes a temperature sensor that is installed between the auxiliary oxidizing converter and the particulate filter. The temperature sensor communicates with a controller, which in the regeneration mode, controls the delivery rate of a fuel pump that feeds the fuel evaporator unit in dependence on the exhaust gas temperature measured upstream of the particulate filter. In this event, using an appropriate automatic variation of the fuel volume delivered to the fuel evaporator unit by the fuel pump, the specific engine operating point and the dependence of the exhaust gas temperature on it can be taken into account with the result that by appropriate adaptation of the vaporized fuel volume, the exhaust gas temperature upstream of the particulate filter can be controlled at a temperature (e.g., 650° C.) optimal for the regeneration of the respective filter.

These and other features of the present invention can be best understood from the following specification and drawings, the following of which is a brief description.

BRIEF DESCRIPTION OF THE DRAWINGS

In the following, this invention is explained using two preferred embodiments schematically represented in the drawing. Shown are.

DETAILED DESCRIPTION OF THE PREFERRED EMBODIMENT

Figure 1:
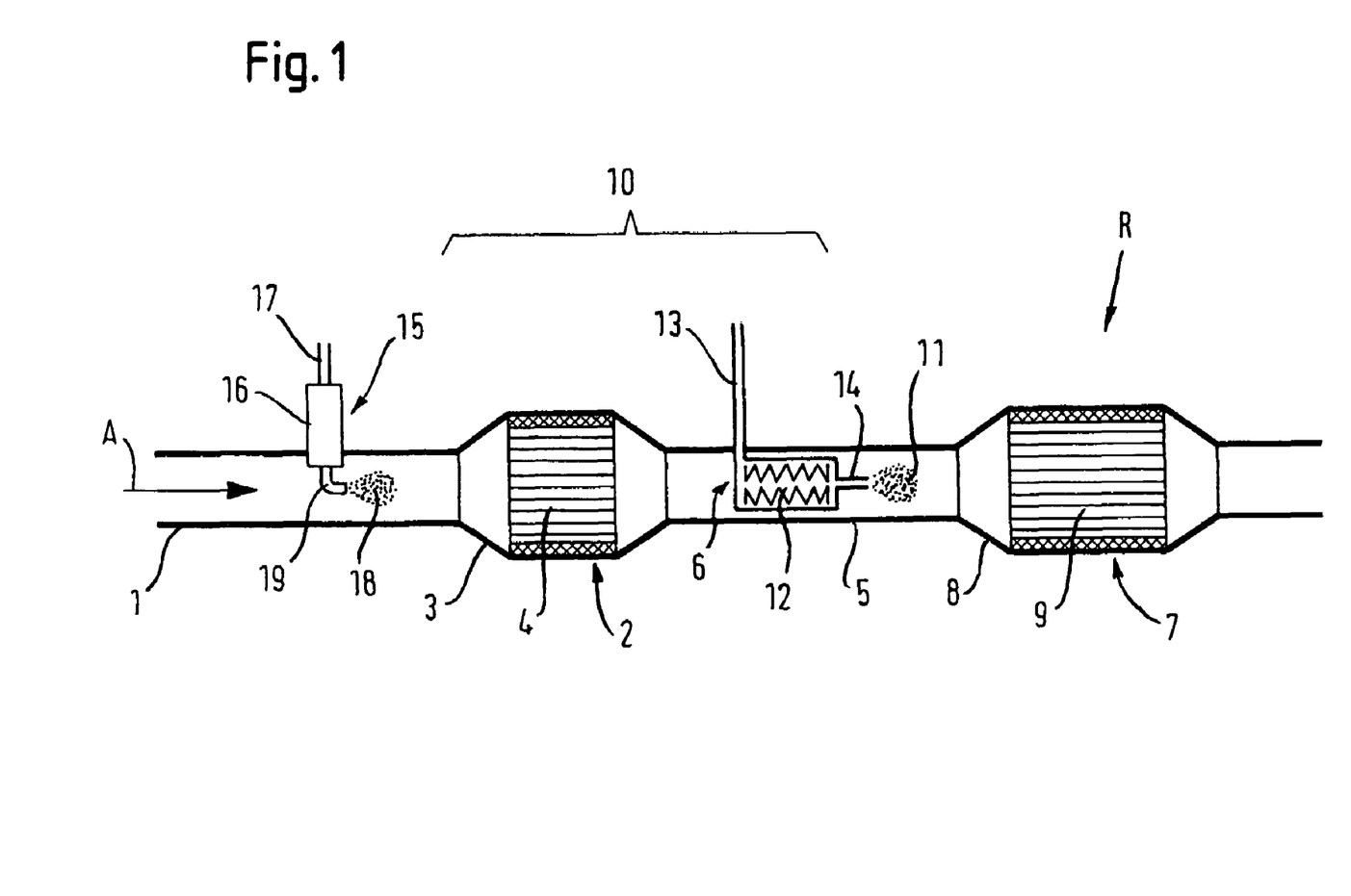
FIG. 1 shows a relevant section of an exhaust system for a motor vehicle, whose exhaust gas purification unit includes a NOx-accumulating catalytic converter to be regenerated periodically.

The section of an exhaust system 29 of a motor vehicle propelled by a diesel engine, represented in FIG. 1—listed sequentially in flow direction A—comprises: a pre-tube 1; an auxiliary oxidizing converter 2 with a catalytic converter body 4 installed in a housing 3; one intermediate tube 5 with a fuel evaporator 6 installed in the intermediate tube 5; and one NOx-accumulating catalytic converter 7 with a housing 8 and a catalytic converter body 9 installed in the NOx-accumulating catalytic converter 7. The NOx-accumulating catalytic converter 7 represents an exhaust gas purification system R to be periodically regenerated. The auxiliary oxidizing converter 2 and the fuel evaporator 6 jointly represent a fuel evaporator unit 10 in which fuel vapors 11 are fed into exhaust gases flowing through the intermediate tube 5.

The fuel evaporator 6 is configured as a heat exchanger 12 in which diesel fuel fed to the heat exchanger 12 through a fuel supply line 13, is vaporized utilizing the heat contained in the exhaust gases and where the fuel vapors 11 are discharged from the heat exchanger 12 using the fuel vapor discharge opening 14.

All of the fuel vapors generated in the heat exchanger 12 are added to the exhaust gases flowing through the intermediate tube 5.

An auxiliary evaporator 16 is provided as an enrichment device 15 that is used to adjust the percentage of nonburned diesel fuel in the exhaust gases fed to the auxiliary oxidizing converter 2. The auxiliary evaporator 16 comprises an electrical heating device in the form of a glow plug on which diesel fuel fed to the auxiliary evaporator 16 through fuel feed line 17, is vaporized. The respective fuel vapors 18 exit the auxiliary evaporator 16 using fuel vapor discharge opening 19, which opens into the pre-tube 1.

Figure 2:
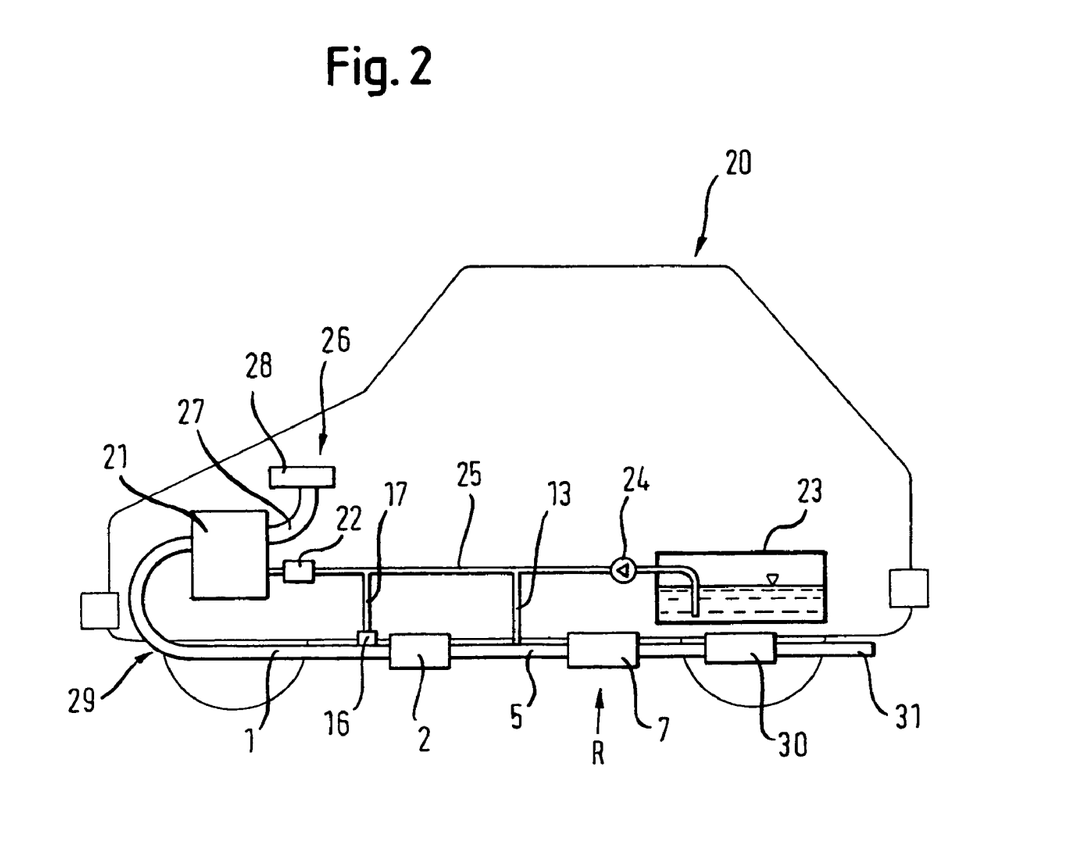
FIG. 2 shows the incorporation of the section of an exhaust system illustrated in FIG. 1, in a vehicle.

The incorporation of the section of an exhaust gas system in the allocated motor vehicle represented in FIG. 1 and explained above, is displayed in FIG. 2. The reference symbols used therein correspond to those used in FIG. 1. A motor vehicle 20 includes in a manner generally known as such, a propulsion engine 21 configured as a diesel engine. An injection pump 22 is allocated to the propulsion engine 21, which receives diesel fuel from a fuel tank 23 using a fuel pump 24 and a fuel line 25. An intake system 26 installed on an intake side comprises an intake manifold 27 and an air filter 28. The configuration of the exhaust system 29 is detailed in the above description of FIG. 1. FIG. 2 however shows that the fuel feed line 13, which provides the fuel evaporator 6 (see FIG. 1) with diesel fuel, as well as the fuel supply line 17, which provides the auxiliary evaporator 16 with diesel fuel, are both connected to the fuel line 25.

In addition to the devices used for the purification of exhaust gases, the exhaust system 29 includes a conventional muffler 30 that is connected to a tail pipe 31.

Figure 3:
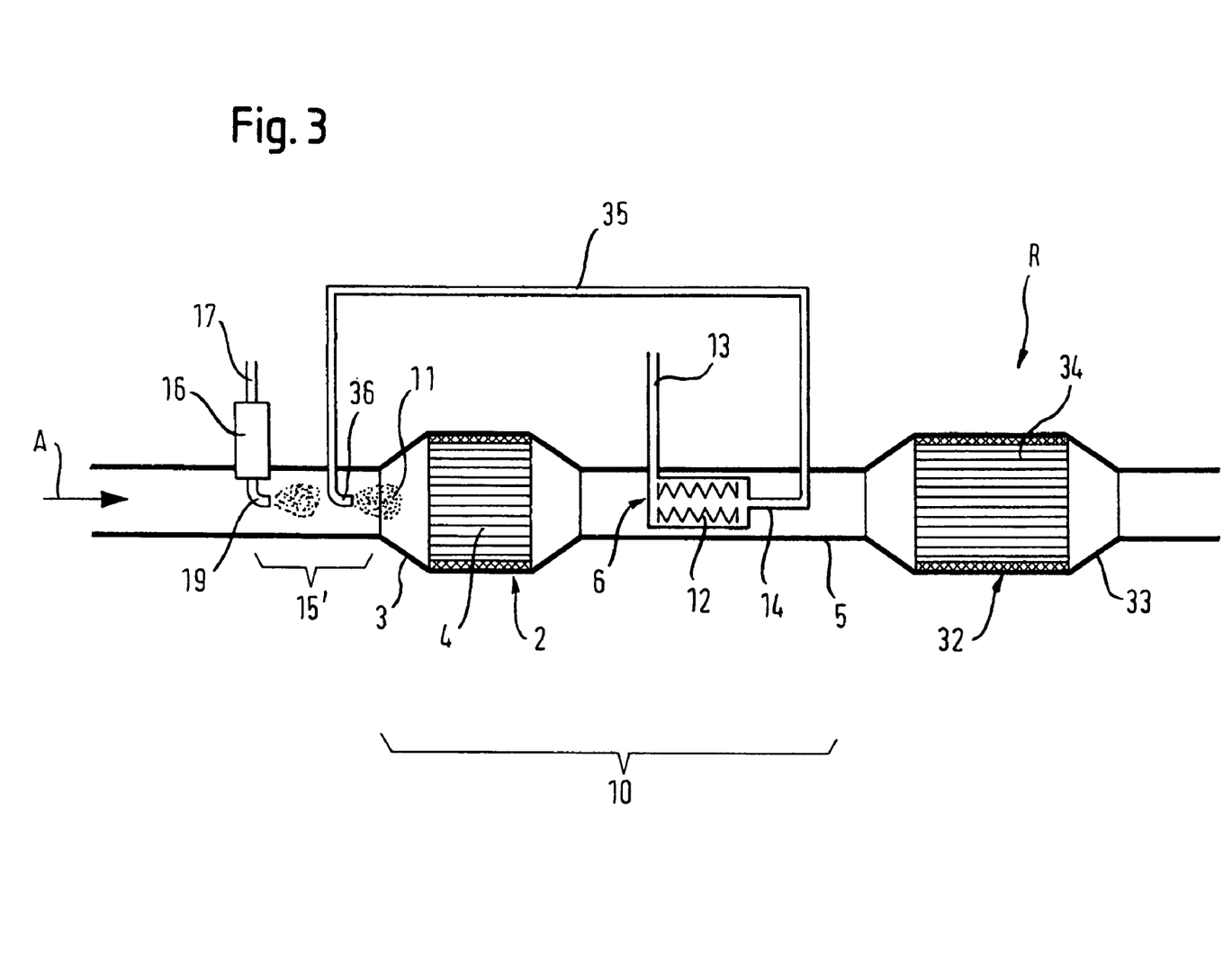
FIG. 3 shows the relevant section of an exhaust system for a motor vehicle whose exhaust gas purification device includes a particulate filter to be regenerated periodically.

FIG. 3 illustrates a potential construction of the exhaust system when the periodically regenerated exhaust gas purification system R is designed to be a particulate filter 32 which comprises a filter body 34—generally known as such—supported in a housing 33.

Deviating from the arrangement illustrated in FIG. 1, here the fuel vapors generated in the fuel evaporator 6 do not exit the fuel vapor discharge opening 14 between the fuel evaporator 6 and the particulate filter 32. Instead the fuel vapors generated in the fuel evaporator 6 are fed to a point upstream of the auxiliary oxidizing converter 2, using a vapor line 35. Accordingly the fuel vapors 11 generated in the fuel evaporator 6 are fed into the exhaust gas stream, upstream of the auxiliary oxidizing converter 2. Accordingly the fuel vapors 11 serve to enrich the exhaust gases streaming toward the auxiliary oxidizing converter 2. In this manner, a feeder 36 through which the fuel vapors 11 are added to the exhaust gases, represents a part of an enrichment device 15'. Apart from the feeder 36, an auxiliary evaporator 16 is included for the fuel vapors 11 generated in the fuel evaporator 6 as described above in conjunction with FIG. 1.

In the light of the explanation of this invention in the description, the systems illustrated in the drawing can be easily modified to make them suitable for the regeneration of a combined exhaust gas purification device comprising a NOx-accumulating catalytic converter as well as a particulate filter.

Figure 4:
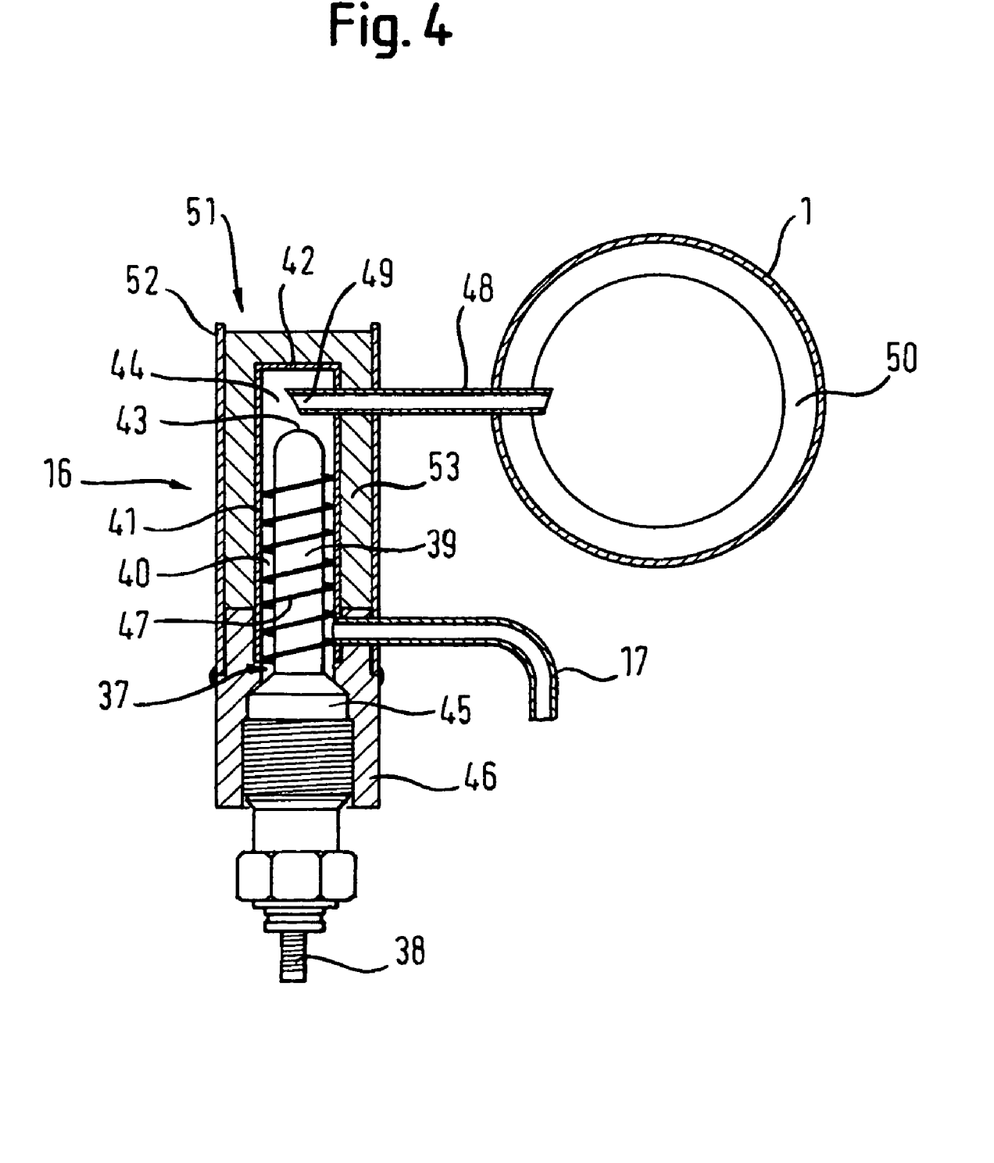
FIG. 4 shows one embodiment of an auxiliary evaporator utilized in the exhaust systems according to FIGS. 1 and 2.

The auxiliary evaporator 16 illustrated in FIG. 4 comprises an electrical heating element in the form of a glow plug 37 in the upright position. An electrical (male) connector 38 accepts an electrical (female) connector cable. A cylindrical glow pencil 39 of the glow plug 37 is encompassed by a jacket tube 41 while maintaining an annular gap 40 with an internal width of 1 mm. On its face the jacket tube is hermetically sealed by a lid 42 where a vapor withdrawal space 44 formed by an appropriate clearance between the lid 42 and a tip 43 of the glow pencil 39. Toward a base 45 of the glow plug 37 the jacket tube 41 is hermetically sealed, aided by a socket 46.

The annular gap 40 contains a spiral lead element 47 that surrounds the glow pencil 39 in a spiral fashion. The fuel feed line 17 discharges into the jacket tube 41 adjacent to the base 45 of the glow plug 37.

A fuel vapor feed line 48 is shaped as a small tube that connects the auxiliary evaporator 16 with the pre-tube 1. An end of the fuel vapor feed line 48 is oriented toward the auxiliary evaporator 16, and represents a fuel vapor withdrawal connector 49, projecting into the vapor withdrawal space 44. The end of the fuel vapor feed line 48 oriented toward the pre-tube 1 projects into the pre-tube 1, that is, at the narrowest cross-section of a venturi insert 50 installed in the pre-tube 1.

The auxiliary evaporator 16 includes an insulator 51 surrounding the jacket tube 41, which comprises an outer tube 52 and an insulating material 53 that fills a space between the jacket tube 41 and the outer tube 52.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A motor vehicle with a diesel propulsion engine and an exhaust system that is equipped with a discontinuously regenerating exhaust gas purification system comprising:
    a fuel evaporator unit provided upstream of the discontinuously regenerating exhaust gas purification system to enrich engine exhaust gases with fuel vapors, the fuel evaporator unit being connected to a vehicle fuel tank;
    the fuel evaporator unit including a fuel evaporator in the form of a heat exchanger that is exposed to an exhaust gas stream, the heat exchanger having a fuel supply line and a fuel vapor discharge opening, and the fuel evaporator unit including an auxiliary oxidizing converter that is upstream of the heat exchanger;
    an intermediate tube that connects the auxiliary oxidizing converter to the discontinuously regenerating exhaust gas purification system, the heat exchanger being located within the exhaust gas flow in the intermediate tube and including an axially extending tubular portion defined by a reduced diameter and terminating at the fuel vapor discharge opening to direct fuel vapors toward the discontinuously regenerating exhaust gas purification system; and
    wherein a percentage of nonburned diesel fuel in exhaust gases fed to the auxiliary oxidizing converter is adjustable using an enrichment device.

2. The motor vehicle according to claim 1 wherein the discontinuously regenerating exhaust gas purification system comprises a discontinuously regenerating particulate filter, wherein the auxiliary oxidizing converter has a regeneration mode in which the auxiliary oxidizing converter heats up exhaust gases streaming toward the discontinuously regenerating particulate filter, using catalytic combustion of the fuel vapors generated in the heat exchanger and added to the exhaust gases upstream of the auxiliary oxidizing converter.

3. The motor vehicle according to claim 1 wherein the discontinuously regenerating exhaust gas purification system comprises a discontinuously regenerating NOx-accumulating converter wherein during a regenerating mode at least a portion of the fuel vapors generated in the heat exchanger is added to exhaust gases downstream of the auxiliary oxidizing converter.

4. The motor vehicle according to claim 1 wherein the enrichment device includes a specific engine controller.

5. The motor vehicle according to claim 1 including a pre-tube feeding exhaust gases into the auxiliary oxidizing converter, and wherein the enrichment device includes a fuel vapor feed line that connects the enrichment device to the pre-tube, the fuel vapor feed line having a fuel vapor inlet to receive fuel vapor from the enrichment device and a fuel vapor outlet that projects into a venturi insert installed in the pre-tube.

6. The motor vehicle according to claim 1 wherein the enrichment device comprises an auxiliary evaporator that includes an electrical heating device that feeds fuel vapors into the exhaust gases upstream of the auxiliary oxidizing converter.

7. The motor vehicle according to claim 6 wherein the auxiliary evaporator is installed with spatial separation from a plurality of exhaust gas carrying components, whereas a fuel vapor feed line extends between the auxiliary evaporator and one exhaust gas carrying component, with the fuel vapor feed line discharging into an exhaust gas carrying component upstream of the auxiliary oxidizing converter.

8. The motor vehicle according to claim 7 wherein the fuel vapor feed line discharges into a cross-sectional restriction of a respective exhaust gas carrying component configured as a venturi nozzle.

9. The motor vehicle according to claim 7 wherein the auxiliary evaporator includes an upright glow plug which is encompassed by a jacket tube while maintaining an annular gap, the jacket tube receiving a fuel feed line and the fuel vapor feed line.

10. The motor vehicle according to claim 9 wherein the annular gap between the upright glow plug and jacket tube is between 0.6 mm and 2 mm.

11. The motor vehicle according to claim 9 including a spiral lead element provided inside the annular gap.

12. The motor vehicle according to claim 9 wherein the fuel vapor feed line has one end oriented toward the auxiliary evaporator and projecting into the jacket tube.

13. The motor vehicle according to claim 9 wherein the jacket tube is encompassed by an insulator.

14. The motor vehicle according to claim 9 wherein at an area of discharge of the fuel vapor feed line, a ratio of a cross-section of the fuel vapor feed line to a cross-section of the exhaust gas carrying component is between 0.006 and 0.015.

15. An exhaust system for a motor vehicle including a diesel propulsion engine comprising:
    a discontinuously regenerating exhaust gas purification system;
    a fuel evaporator unit positioned upstream of the discontinuously regenerating exhaust gas purification system for enriching engine exhaust gases with fuel vapors, the fuel evaporator unit being adapted for connection to a vehicle fuel tank;

the fuel evaporator unit comprising a heat exchanger and an auxiliary oxidizing converter positioned upstream of the heat exchanger, the heat exchanger being exposed to an exhaust gas stream and having a fuel supply line and a fuel vapor discharge opening, and the fuel evaporator unit including an intermediate tube that connects the auxiliary oxidizing converter to the discontinuously regenerating exhaust gas purification system, the heat exchanger being located within the exhaust gas flow in the intermediate tube and including an axially extending tubular portion defined by a reduced diameter and terminating at the fuel vapor discharge opening to direct fuel vapors toward the discontinuously regenerating exhaust gas purification system; and an enrichment device that adjusts a percentage of non-burned diesel fuel in exhaust gases fed to the auxiliary oxidizing converter.

16. The exhaust system according to claim 15 including at least one of a NOx-accumulating catalytic converter and a particulate filter positioned downstream of the heat exchanger.

17. The exhaust system of claim 15 wherein the enrichment device comprises an auxiliary evaporator positioned upstream of the auxiliary oxidizing converter.

18. The exhaust system of claim 15 wherein the enrichment device comprises an auxiliary evaporator that includes a glow plug surrounded by a jacket tube, and wherein a fuel vapor feed line extends into the jacket tube to connect the auxiliary evaporator to a pre-tube positioned upstream of the auxiliary oxidizing converter.

19. The exhaust system of claim 15 including a pre-tube feeding exhaust gases into the auxiliary oxidizing converter, and wherein the enrichment device includes a fuel vapor feed line that connects the enrichment device to the pre-tube, the fuel vapor feed line having a fuel vapor inlet to receive fuel vapor from the enrichment device and a fuel vapor outlet that projects into a venturi insert installed in the pre-tube.

20. An exhaust system for a motor vehicle including a diesel propulsion engine comprising:

a discontinuously regenerating exhaust gas purification system;

a fuel evaporator unit positioned upstream of the discontinuously regenerating exhaust gas purification system for enriching engine exhaust gases with fuel vapors, the fuel evaporator unit being adapted for connection to a fuel tank;

the fuel evaporator unit comprising a fuel evaporator and an auxiliary oxidizing converter positioned upstream of the fuel evaporator, the fuel evaporator being positioned within an intermediate tube connecting the auxiliary oxidizing converter to the discontinuously regenerating exhaust gas purification system, and wherein the fuel evaporator comprises a heat exchanger that is exposed to an exhaust gas stream within the intermediate tube and that has a fuel supply line and a reduced diameter tubular portion that extends in an axial direction and terminates at a fuel vapor discharge opening to direct fuel vapors toward the discontinuously regenerating exhaust gas purification system;

a pre-tube feeding exhaust gases into the auxiliary oxidizing converter; and an enrichment device that adjusts a percentage of non-burned diesel fuel in exhaust gases fed to the auxiliary oxidizing converter, wherein the enrichment device comprises a glow plug enclosed within a tubular housing, and wherein the enrichment device includes a fuel vapor feed line having one end positioned near an end of the glow plug within the tubular housing and an opposite end projecting into a venturi insert installed within the pre-tube.

21. The exhaust system according to claim 20 wherein the discontinuously regenerating exhaust gas purification system comprises one of a NOx-accumulating catalytic converter and a particulate filter.

* * * * *

UNITED STATES PATENT AND TRADEMARK OFFICE
CERTIFICATE OF CORRECTION

PATENT NO.        : 7,581,386 B2
APPLICATION NO. : 10/499897
DATED             : September 1, 2009
INVENTOR(S)       : Ranalli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Fourteenth Day of September, 2010

David J. Kappos
*Director of the United States Patent and Trademark Office*